United States Patent [19]

Fuchs et al.

[11] 4,144,208

[45] Mar. 13, 1979

[54] COLD CROSS-LINKING DISPERSION ADHESIVE

[75] Inventors: Gundolf Fuchs, Hemmingstedt; Heiko Humbert, Hamburg; Dietrich Pirck, Seevetal, all of Fed. Rep. of Germany

[73] Assignee: Deutsche Texaco Aktiengesellschaft, Hamburg, Fed. Rep. of Germany

[21] Appl. No.: 824,635

[22] Filed: Aug. 15, 1977

[30] Foreign Application Priority Data

Aug. 17, 1976 [DE] Fed. Rep. of Germany ....... 2636863

[51] Int. Cl.$^2$ .............................................. C08J 3/24
[52] U.S. Cl. .......................... 260/27 R; 260/29.6 TA; 526/16; 526/292
[58] Field of Search ................................ 526/16, 292; 260/29.6 TA, 27 R

[56] References Cited

FOREIGN PATENT DOCUMENTS 1643144  5/1974  Fed. Rep. of Germany.

*Primary Examiner*—V. P. Hoke
*Attorney, Agent, or Firm*—Thomas H. Whaley; Carl G. Ries; Henry W. Archer

[57] ABSTRACT

Cold cross linking polyacrylic acid esters-based dispersion adhesives having a viscosity in the range of 800 to 1000 cps and a solids content of about 40 to 60 weight percent containing a copolymer prepared from 65 to 85 weight percent of 2-ethylhexyl acrylate; 0 to 20 weight percent of n-butylacrylate; 8 to 12 weight percent of acrylonitrile; 2 to 6 weight percent of acrylic acid; 0.5 to 2 weight percent of hydroxylakylmethacrylate; 1.0 to 5 weight percent, basis copolymer, of an internal or external acetoacetic ester cross-linking agent derived from the esterification with $C_2$ to $C_6$ diols or 1,1,1-tris(acetoxymethyl) alkanes wherein the alkane group contains from 3 to 7 carbon atoms and optionally, calophonium and other fillers or adhesive additives.

3 Claims, No Drawings

COLD CROSS-LINKING DISPERSION ADHESIVE

FIELD OF THE INVENTION

Adhesives in the form of aqueous dispersions are adopted preferably in the building industry, for example for sticking down floor coverings because, as compared with solvent adhesives, they have a series of advantages. They can be prepared with higher concentrations of high molecular material, which represents the actual adhesive, are not combustible, are not poisonous and are more economical. Most of these adhesives are aqueous dispersions, with or without filling materials, tackifiers and the like, on the basis of polyacrylic acid esters, polyvinylacetate and polyisobutylene.

The invention relates to dispersion adhesives on the basis of polyacrylic acid esters. The known adhesives of this type contain copolymers of acrylic acid esters as the actual adhesive with which small amounts of acrylonitrile and acrylic acid are incorporated by way of polymerisation, so that the nitrile and carboxyl groups impart the adhesion characteristic of the adhesive in the most diverse systems.

Dispersion adhesives set after the evaporation of the water. If the cohesive properties, in particular the temperature stability, are to be improved, cross-linking agents must be incorporated in the adhesive system. According to DT-AS No. 1,594,147 the procedure may be such that one prepares a cross-linkable copolymer and admixes a cross-linking component, e.g., a resin. The cross-linking takes place only after the addition of a catalyst. From the DT-PS No. 1,297,270 it is known to incorporate N-methylol-, N-methylether-, halogenhydrin and/or epoxide groups by way of polymerisation into a copolymer of vinylacetate, vinylpropionate and/or acrylate monomers. In many cases cross-linking takes place after the application of the adhesive, but in some cases it is recommended to add a reaction accelerator, such as an acid or a base. Because the cross-linking at once ensues after admixing a catalyst with an adhesive, adhesive-catalyst systems are unsuitable where large areas are to be treated.

From R. Reinecke and W. Schmieder ("Adhasion" 1973 pp 312–316) comes the proposal to incorporate monochloracetic acid vinyl ester by way of polymerisation into the copolymer. The cross-linking takes place after addition of aqueous alkali. Monochloracetic acid vinyl ester is, however, unobtainable in commerce and because the compound is very unstable it is also unsuitable in practice. Finally DT-AS No. 1,643,144 should be mentioned in which is described a method of preparing halogenat acrylic acid esters, such as chloracetoxyethylacrylate. These compounds are recommended as comonomers for the production of elastomers, which can be vulcanized on account of the presence of the reactive halogen.

Of disadvantage in these known dispersion adhesives having a built-in (internal) cross-linking agent is the fact that the polymerisation and the neutralisation of dispersions when polymerised in a strongly acid environment must be effected with great care in order that the cross-linking does not set in prematurely before the application of the adhesive. It is at the high temperature of 70–80° C., such as exist at the end of the polymerisation reaction that the reactive groups of the copolymer are particularly reactive to alkali, yet the pH value of the polymerised dispersion must be already increased at the beginning of the cooling because otherwise the viscosity rises too steeply.

In the co-pending Application Ser. No. 824,634, filed Aug. 15, 1977 of the present Applicant there is described a dispersion adhesive containing a cross-linking agent, which, instead of being built into the copolymer, is an "external" cross-linking agent added after the polymerisation. This cross-linking agent is characterised in that it contains at least two $Cl.CH_2.CO$ groups. Although the chlorine content of this adhesive is very small yet it may in certain cases be a disadvantage, e.g., by influencing the corrosion properties, the colour of one or both substrates and the like.

This invention therefore takes as its basic purpose the provision of a dispersion adhesive containing a chlorine-free external cross-linking agent. The problem is solved by a cold cross-linking dispersion adhesive on the basis of polyacrylic acid esters, characterised by an aqueous dispersion containing (a) a copolymer prepared from, in % by weight, 85-65 2-ethylhexylacrylate, 0–20 n-butylacrylate, 8–12 acrylonitrile, 2–6 acrylic acid, 0.5–2 acrylamide, and/or 0.5–2 hydroxyalkylmethacrylate, (b) 1–5% by weight, based on the copolymer, of a compound acting as an external cross-linking agent having at least one acetoacetic ester group $CH_3.CO.CH_2.CO.O$, and optionally, (c) colophonium, fillers and other adhesive additives, and having a solids content from about 40 to 60% by weight and a viscosity in the range of from 800 to 1000 cPs.

Surprisingly, it has been found that the polyacrylic acid ester and acetoacetic ester copolymers, with which is incorporated a small quantity of amide-and/or hydroxyl group -containing monomers, can cross-link without the influence of heat or catalysts.

According to one practical example of the invention the cross-linking agent includes an acetoacetic ester and a group having a polymerisable double bond. This cross-linking agent can then be incorporated into the copolymer via the double bond and functions as an internal cross-linking agent, an example of which cross-linking agent is the acetoacetic ester of a $\beta$-hydroxyalkylacrylate or -methacrylate.

According to a preferred practical example of the invention the cross-linking agent is a compound with two or more acetoacetic ester groups and is added to the dispersion at some point of time after completion of the polymerisation and before applying the adhesive. Such compounds are, for example 1,6-bis-acetoacetoxyalkane in which the alkane group comprises from 2 to 6 carbon atoms, and 1,1,1-tris-(acetoacetoxy-methyl)-alkane the alkane groups of which comprise from 3 to 7 carbon atoms. The cross-linking agents which are present in the dispersion adhesives according to the invention may be produced in a simple manner. They may be prepared by the addition of diketones to the appropriate hydroxyl compounds. The polymerisable compounds are preferably prepared from $\beta$-hydroxyalkylacrylates or methacrylates and diketones. Polyacetoacetyl esters are obtained by the conversion of polyvalent alcohols such as glycerine, trimethylol alkanes, hexanediol and other glycols with diketones.

If the acetoacetate of a hydroxyalkyl ester of an unsaturated carboxylic acid is introduced, then the hydroxyl ester can be added in excess when preparing this cross-linking agent, whereby the quantitative decomposition of the diketone is facilitated, because the hydroxyl ester is itself a component of the monomer mixture for the adhesive dispersion. It is also possible when preparing the adhesive dispersion, to add directly to the polymerisation mixture, a mixture of reaction product and excess components.

The copolymers in the inventive adhesive dispersions comprise, as already more particularly described above, mainly, i.e., up to 85% by weight of 2-ethylhexylacrylate; which may be replaced by up to 20% by weight of butylacrylate. By polymerisation of these monomers, the open time of the adhesive is indeed somewhat curtailed, but the tensile strength and thermal stability are further improved. Acrylonitrile is incorporated by way of polymerisation in a proportion of 8–12% by weight, preferably 10%, whereby good adhesion is ensured. The copolymer also contains as a monomer unit 2–6%, preferably 5% by weight of acrylic acid and 1.5–3%, preferably 2% by weight of a monomer unit with hydroxyl groups and/or amino groups.

The invention, and the advantages which accrue therefrom, will now be more clearly stated with reference to the following examples.

General description of the examples

The examples were carried into effect with dispersion adhesives, which are different from each other in respect of the proportions of 2-ethylhexylacrylate (EH) and n-butylacrylate (BU) in the copolymer, as well as in the type and the quantity of the cross-linking agent. In addition to carrying out examples according to the invention there were also carried out, for the purpose of comparison, examples with 2-(2-chloroacetoxyethylmethacrylate) as an internal cross-linking agent, that is to say a cross-linking agent built into the copolymer.

The dispersion adhesives were prepared in all the examples according to the same method. In each case there was prepared a monomer mixture A, B or C and, separately therefrom, an aqueous phase of the following composition.

| Monomer mixture (g) | A | B | C |
|---|---|---|---|
| ethylhexylacrylate (EH) | 425 | 340 | 255 |
| n-butylacrylate (BU) | — | 85 | 170 |
| acrylonitrile | 50 | 50 | 50 |
| acrylic acid | 15 | 15 | 15 |
| acrylic acid amide | 5 | 5 | 5 |
| hydroxyethylmethacrylate | 5 | 5 | 5 |
| EH/BU proportion | 100/00 | 80/20 | 60/40 |
| Aqueous phase | | | |
| Water (desalinized) | 414.0 | | |
| Anionic emulsifier | 25.0 | | |
| Non-ionic emulsifier | 5.0 | | |
| Ammonium peroxydisulphate | 5.0 | | |
| Sodium disulphite | 0.5 | | |
| Defoamer | 0.5 | | |
| Soda lye* (15-%) | 50.0 | | |

*Added after the polymerisation in two stages 1st stage pH ~ 5, 2nd stage pH > 10.

Description of the preparation of 1,000 g of dispersion (50%):

¼ of the monomer mixture (125 g), the internal cross-linking agent, where appropriate, (0.62 or 1.25 g) and of the aqueous phase (125 g), were placed in a 2-1 reaction vessel and heated up to 75–80° C. whilst being strongly stirred (400 rpm). Within this temperature range the polymerisation reaction started up with a clearly marked heat of reaction.

The remaining ¾ proportion of the monomer mixture, the internal cross-linking agent, where appropriate, and the aqueous phase in a pre-emulsified condition, were slowly added over a period of 2 hours. In this operation an internal temperature of about 80° C. was established, which was also maintained for a further hour, after completing the addition, for the purpose of finalising the conversion.

From the polymerisation reaction there resulted 1,000 g of a fine particle, coagulate-free dispersion having a solid content of about 50%. The viscosity of the dispersion was below 1,000 cPs, and the pH value amounted to about 5.

In the case where an external cross-linking agent was introduced, after preparing the dispersion, and in parallel experiments, the prescribed quantity was added by mixing in the appropriate recipe. In both of the parallel experiments, the results were always similar.

The adhesive dispersions obtained by means of the examples were used to stick polyvinylchloride floor coverings onto Eternit sheets. The coated parts were stuck together after different exposure times, and in each case the stripping resistance was determined as a measure of the "open time".

Furthermore these examples were stored at definite temperatures for predetermined periods, these being:

| | |
|---|---|
| Sample b | 7 × 24 hour at 20° C. |
| Sample c | 1 × 24 hour at 20° C. |
| | 5 × 24 hour at 50° C. |
| | 1 × 24 hour at 20° C. |

The thermal stability was determined as a measure for the temperature stability of the adhesive joint and the tensile shear strength was also determined.

Determination of the stripping resistance: A layer of dispersion adhesive in a thickness of about 0.3 mm was applied to an Eternit sheet (50 × 60 mm), and after an exposure time between 5 and 60 minutes a PVC film (40 × 100 mm; adhering area surface 40 × 40 mm) was stuck to it at a pressure of 0.1 kp/cm$^2$ for 10 seconds. Immediately afterwards the adhered joint was stripped at a shearing force of 75 g at 20° C. at a stripping angle of 90°, and the time taken for complete release was measured in minutes.

Determination of the thermal stability: A layer of dispersion adhesive was applied in a thickness of about 0.3 mm to a plate of Eternit, was allowed to dry for 120 minutes, to which a PVC film was stuck at a pressure of 3 kp/cm$^2$ for 10 seconds, the overlapping surface of the joint being 4 cm$^2$. After one hour at room temperature, a weight of 800 g was suspended from the lower edge of the film projecting beyond the vertically held Eternit plate, and at 100° C. the time within which the adhesive joint was released was measured in minutes.

Determination of the tensile-shear strength: a layer of dispersion adhesive was applied in a thickness of about 0.3 mm to a plate of Eternit, was allowed to dry and a PVC film of the same size was applied thereto at a pressure of 3 kp/cm$^2$ for 10 seconds. After being stored at room temperature for 1 hour, the film was moved in a vertical direction through 100 mm per minute and the force necessary to do this was measured in kp/10 cm$^2$.

The Examples are set out below in tabular form. From the Tables there can be seen the monomer mixture from which the copolymer has been prepared, which cross-linking agent was used and the quantities in which it was added. Furthermore there are given the properties of the dispersion adhesive prepared in the individual examples, that is to say the "open time", the tensile-shear strength and its thermal stability.

As may be seen from the two tables, the inventive adhesive dispersions, which contain 2% of cross-linking agent, in all cases satisfy and if not even exceed the minimum values of the specification. Therefore the invention has made it possible, by means of the chlorine-free dispersion adhesives, to obtain adhesive bonds of the desired quality.

|  | Examples according to the invention | | | | Comparison examples | |
|---|---|---|---|---|---|---|
| Example No. | 1 | 2 | 3 | 4 | 5 | 6 |
| Monomer mixture | A | A | B | C | C | A |
| Cross-linking agent* | I | II | III | IV | V | V |
| Cross-linking agent (wt %) | 2 | 2 | 2 | 2 | 0.5 | 0.5 |
| Open time (min) | 7,5–60 | 5–60 | 7,5–60 | 7,5–55 | 10–25 | 7,5–55 |
| Tensile-shear-strength | | | | | | |
| b | 106 | 105 | 106 | 109 | 108 | 100 |
| c | 103 | 101 | 100 | 107 | 106 | 95 |
| Thermal stability | | | | | | |
| b | 5.5 | 5.5 | 5 | 6 | 6 | 6.5 |
| c | 10 | 9 | 8.5 | 9 | 9.5 | 9.5 |

*I 1,1,1-Tris acetoacetoxymethyl-pentane
II Bis-acetoacetoxy-hexane
III 2-(Acetoacetoxy)-ethylmethacrylate
IV 1,2,3-Tri acetoacetoxypropane
V 2-(2-Chloracetoxy)-ethylmethacrylate Specification-minimum values:
Tensile-shear-strength
b  105
c  100
Thermal stability
b  5
c  8.5
Open time  10–45

What is claimed is:

1. Cold cross-linking polyacrylic acid esters-based adhesive composition comprising an aqueous dispersion of about 40 to 60 percent weight solids content with a viscosity of about 800 to 1000 pcs, containing
   (a) a copolymer prepared from, in wt.%, 85-62 2-ethylhexylacrylate, 0-20 n-butylacrylate, 8-12 acrylonitrile, 2-6 acrylic acid, 0.5-2 acrylamide, and 0 to 2 hydroxyalkylmethacrylate, and
   (b) 1-5 wt.%, based on the copolymer, of an acetoacetic acid ester cross-linking agent having at least one acetocetic ester group, derived from esterifica with $C_2$ to $C_6$ diols or 1,1,1-tris(acetoacetoxy-methyl alkanes wherein in the alkane group contains from 3 to 7 carbon atoms.

2. Adhesive composition as claimed in claim 1, wherein said cross-linking agent is a compound comprising at least two acetoacetic ester groups and is added to said dispersion upon completion of said copolymerisation.

3. The composition of claim 1, also containing colophonium, fillers and other adhesives.

* * * * *